United States Patent
Marques et al.

(10) Patent No.: US 10,344,665 B2
(45) Date of Patent: Jul. 9, 2019

(54) COMPRESSOR RECIRCULATION SYSTEM HAVING COMPRESSOR INLET RECIRCULATION DUCT CONFIGURED TO REDUCE NOISE FROM ROSSITER EXCITATION AND CAVITY ACOUSTIC RESONANCE

(71) Applicant: Honeywell International Inc., Morris Plains, NJ (US)

(72) Inventors: Manuel Marques, Richardmenil (FR); Gladys Gaude, Girmont (FR); Bruno Batista, Girmont (FR); Alexandre Rigault, Richardmenil (FR)

(73) Assignee: Garrett Transportation I Inc., Torrance, CA (US)

( * ) Notice: Subject to any disclaimer, the term of this patent is extended or adjusted under 35 U.S.C. 154(b) by 187 days.

(21) Appl. No.: 15/372,333

(22) Filed: Dec. 7, 2016

(65) Prior Publication Data
US 2017/0211465 A1  Jul. 27, 2017

Related U.S. Application Data

(60) Provisional application No. 62/281,945, filed on Jan. 22, 2016.

(51) Int. Cl.
*F02B 37/16* (2006.01)
*F04D 17/10* (2006.01)
(Continued)

(52) U.S. Cl.
CPC ............. *F02B 37/16* (2013.01); *F04D 17/10* (2013.01); *F04D 27/0215* (2013.01);
(Continued)

(58) Field of Classification Search
CPC ............... F01D 17/105; F04D 27/0215; F04D 27/0238; F04D 29/4233; F04D 29/685;
(Continued)

(56) References Cited

U.S. PATENT DOCUMENTS 3,462,071 A * 8/1969 Garve ..................... F02B 33/00
123/559.1
4,517,803 A   5/1985 Jamison
(Continued)

FOREIGN PATENT DOCUMENTS

DE  102004024948 A1  12/2005
DE  102009012732 A1  9/2010
(Continued)

OTHER PUBLICATIONS

Machine Translation 10 2004 024948 Done Jun. 7, 2018.*
Search Report and Opinion from the EPO for Application No. 17151052.2-1607 dated Jun. 14, 2017.

*Primary Examiner* — Patrick D Maines
*Assistant Examiner* — Dapinder Singh
(74) *Attorney, Agent, or Firm* — John C. James

(57) ABSTRACT

A compressor includes a compressor housing defining a cavity, and a compressor wheel disposed in the cavity, the compressor housing defining an inlet for leading air into the compressor wheel, a discharge volute for receiving air compressed by the compressor wheel, and a recirculation duct connected to the inlet at a location upstream of the compressor wheel. A recirculation valve is disposed between the discharge volute and the recirculation duct for regulating air flow through the recirculation duct into the inlet. The recirculation duct defines multiple parallel channels, the multiple parallel channels respectively conducting multiple parallel streams of air from the recirculation valve into the inlet.

6 Claims, 7 Drawing Sheets

(51) Int. Cl.
*F04D 29/42* (2006.01)
*F04D 29/68* (2006.01)
*F04D 27/02* (2006.01)
*F04D 29/66* (2006.01)
*F02B 37/12* (2006.01)

(52) U.S. Cl.
CPC ..... *F04D 27/0238* (2013.01); *F04D 29/4213* (2013.01); *F04D 29/4233* (2013.01); *F04D 29/665* (2013.01); *F04D 29/685* (2013.01); *F02B 2037/125* (2013.01); *F05D 2220/40* (2013.01); *Y02T 10/144* (2013.01)

(58) Field of Classification Search
CPC .... F04D 29/4213; F04D 29/665; F04D 17/10; F05D 2220/40; Y02T 10/144; F02B 37/16; F02B 2037/125
USPC ............. 60/605.1, 611; 415/56.4, 56.5, 57.1, 415/58.4, 144, 145, 206
See application file for complete search history.

(56) References Cited

U.S. PATENT DOCUMENTS

| | | | |
|---|---|---|---|
| 5,173,021 | A | 12/1992 | Grainger et al. |
| 6,651,431 | B1* | 11/2003 | Yang ........................ F01D 9/026 123/559.1 |
| 7,757,873 | B2 | 7/2010 | Thiery et al. |
| 8,161,745 | B2* | 4/2012 | Dorle ........................ F01D 9/026 60/605.1 |
| 8,287,232 | B2* | 10/2012 | Gu ........................ F04D 27/0215 415/56.5 |
| 9,476,351 | B2* | 10/2016 | Murayama .............. F02B 37/16 |
| 9,677,568 | B2* | 6/2017 | Vetter ................... F04D 27/009 |
| 9,719,518 | B2* | 8/2017 | Mohtar ................. F04D 25/045 |
| 2005/0022526 | A1* | 2/2005 | Scheinert ........... F02B 29/0412 60/611 |

FOREIGN PATENT DOCUMENTS

| | | |
|---|---|---|
| DE | 102011115830 A1 | 4/2013 |
| DE | 102014223845 A1 | 5/2016 |
| JP | 11182257 A | 7/1999 |

\* cited by examiner

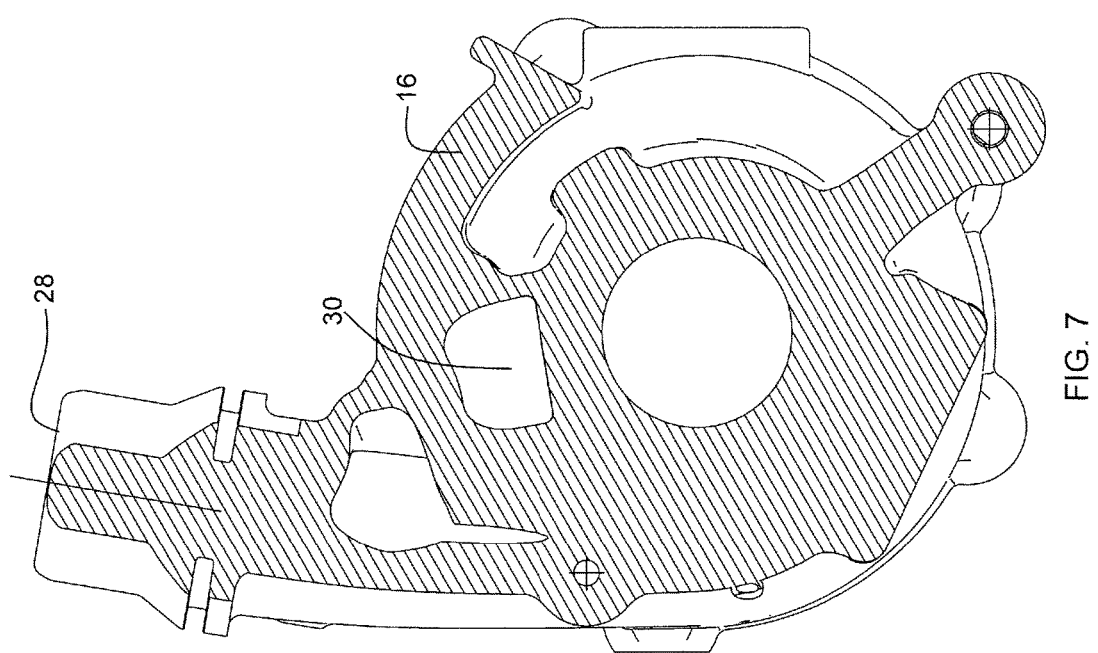

COMPRESSOR RECIRCULATION SYSTEM HAVING COMPRESSOR INLET RECIRCULATION DUCT CONFIGURED TO REDUCE NOISE FROM ROSSITER EXCITATION AND CAVITY ACOUSTIC RESONANCE

BACKGROUND OF THE INVENTION

The present disclosure relates to centrifugal compressors, such as used in turbochargers, and more particularly relates to centrifugal compressors that include a compressor recirculation system employing a recirculation valve for regulating the recirculation of air from the compressor discharge to the compressor inlet.

Compressors in vehicle turbochargers are prone to surge during certain operating conditions such as low-flow rate, high rotational speed conditions (e.g., when the engine and turbocharger are operating at high speed and relatively open throttle and the driver takes his foot off the accelerator pedal so as to suddenly reduce the air flow demanded by the engine).

To reduce the likelihood of surge, it is known to employ a compressor recirculation system, which bleeds off a portion of the pressurized air from the compressor discharge volute and recirculates it back into the compressor inlet. The recirculation system employs a recirculation valve disposed between the compressor discharge volute and the compressor inlet, and a recirculation duct leading from the recirculation valve into the compressor inlet. In a typical prior-art type of recirculation system, the compressor inlet recirculation duct is a round or nearly round cylindrical volume.

BRIEF SUMMARY OF THE DISCLOSURE

The compressor inlet recirculation duct can be a source of noise if not designed carefully. The causes of noise from the recirculation duct include aerodynamic cavity excitation (so-called Rossiter excitation) as well as cavity acoustic resonance. The duct has a natural frequency dependent on the total volume and configuration of the duct, and resonance at the natural frequency can generate substantial noise. One solution that might be considered is to change the natural frequency, by increasing or decreasing the duct volume, so that resonance at the natural frequency will not occur. However, the volume cannot be reduced significantly because of flow requirements, and the volume cannot be increased significantly because of packaging constraints in the engine compartment.

In accordance with the invention, Rossiter-type excitation noise and cavity acoustic resonance noise are reduced by designing the compressor inlet recirculation duct not as a single cylindrical volume, but as multiple channels or volumes. As one example, the duct can be divided into two parallel channels (essentially a round or oval duct with a divider wall that divides it into two halves that extend parallel to each other in the flow direction along the channels). In this manner, each channel has roughly half the volume of the original single-duct design, and hence the natural frequency of each channel is raised substantially relative to the single-duct design.

In accordance with various embodiments described herein, a compressor includes a compressor housing defining a cavity, and a compressor wheel disposed in the cavity. The compressor housing defines an inlet for leading air into the compressor wheel, a discharge volute for receiving air compressed by the compressor wheel, and a recirculation duct connected to the inlet at a location upstream of the compressor wheel. A recirculation valve is disposed between the discharge volute and the recirculation duct for regulating air flow through the recirculation duct into the inlet. In accordance with the embodiments of the invention, the recirculation duct comprises multiple parallel channels, the multiple parallel channels respectively conducting multiple parallel streams of air from the recirculation valve into the inlet.

In one embodiment, the recirculation duct comprises two parallel channels. The two channels are formed by a dividing wall that divides the recirculation duct in two. The two channels can have equal cross-sectional areas on a cross-section that is perpendicular to a flow direction along the recirculation duct, or they can have different cross-sectional areas. The dividing wall has a length that extends along a flow direction through the recirculation duct, and a width that extends perpendicular to the flow direction. In accordance with the embodiment, the width extends along an axial direction of the compressor.

In another embodiment, the width of the dividing wall extends perpendicular to the axial direction of the compressor. Other variations are also possible and included in the scope of the claimed invention.

In another aspect of the invention, a turbocharger includes a compressor in accordance with any of the embodiments described herein, and an exhaust gas-driven turbine comprising a turbine wheel disposed in a turbine housing. The compressor wheel and turbine wheel are mounted on a common shaft that is supported by bearings disposed in a center housing.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 7 is a cross-sectional view along line 7-7 in FIG. 6.

DETAILED DESCRIPTION OF THE DRAWINGS

The present inventions now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
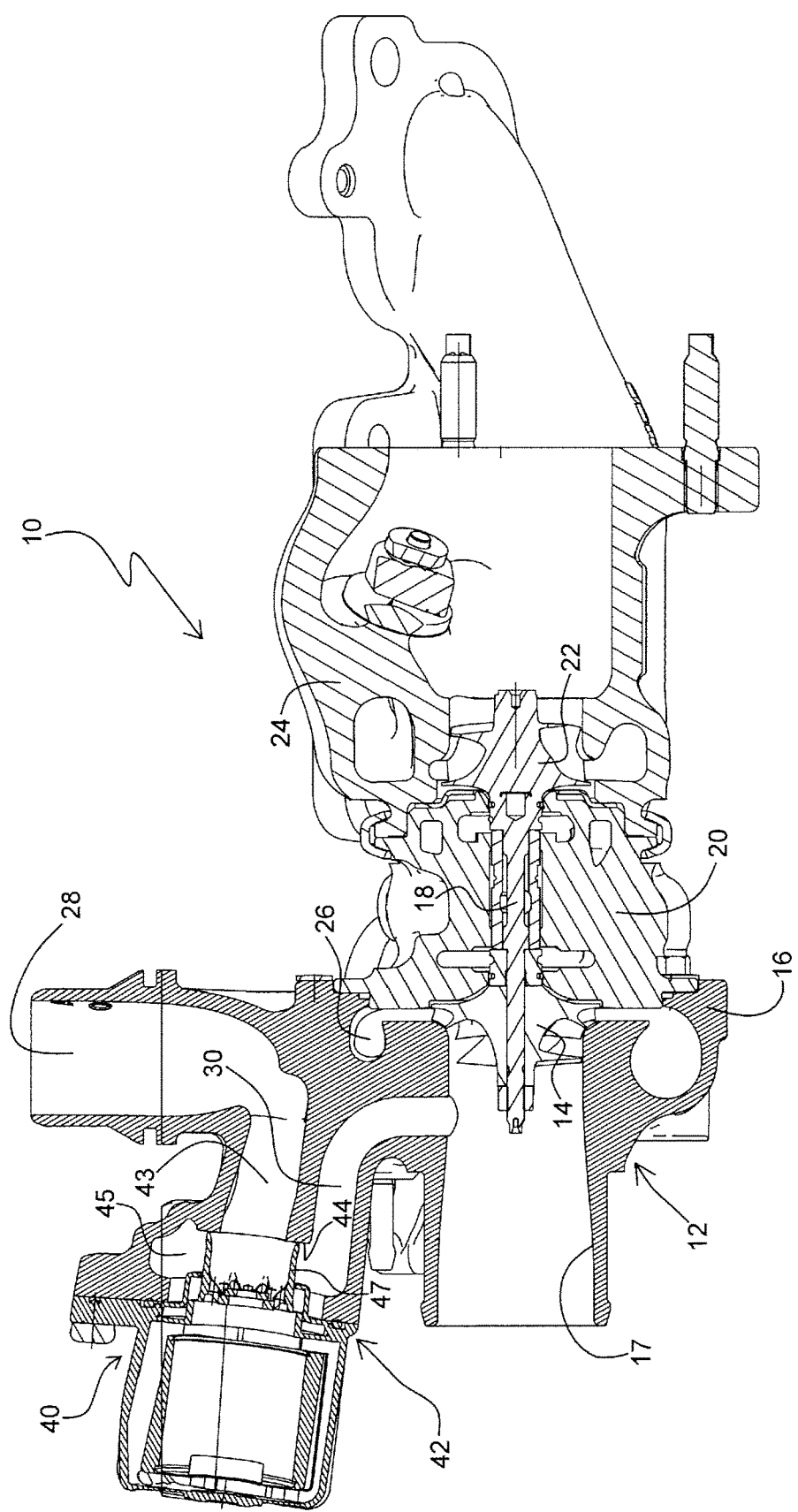
FIG. 1 is an axial cross-sectional view of a turbocharger that includes a compressor in accordance with a first embodiment of the invention.
Figure 2:
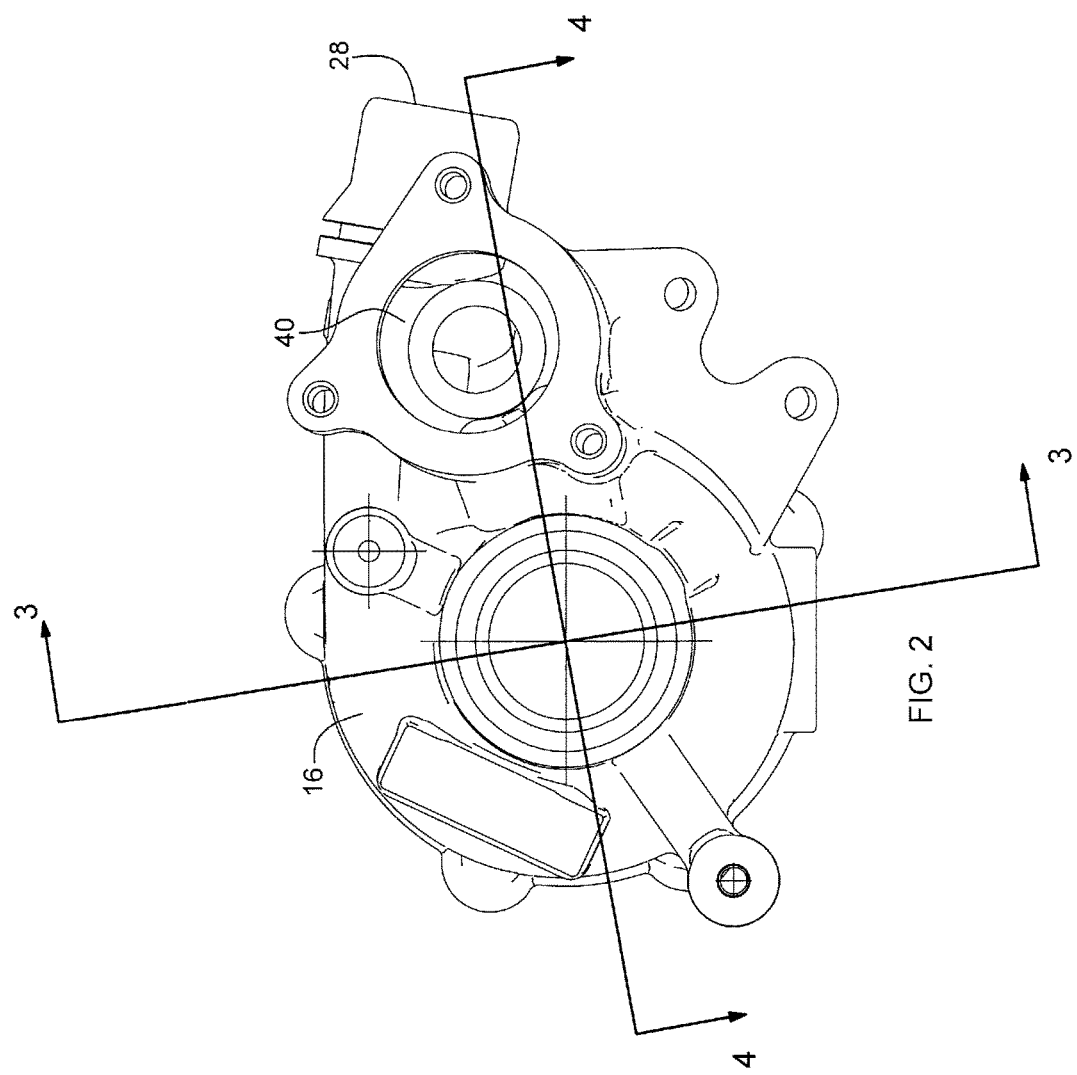
FIG. 2 is a front view of the compressor housing in accordance with the first embodiment of the invention, wherein a flow direction along the inlet to the compressor, which also constitutes an axial direction of the compressor, is into the page.
Figure 3:
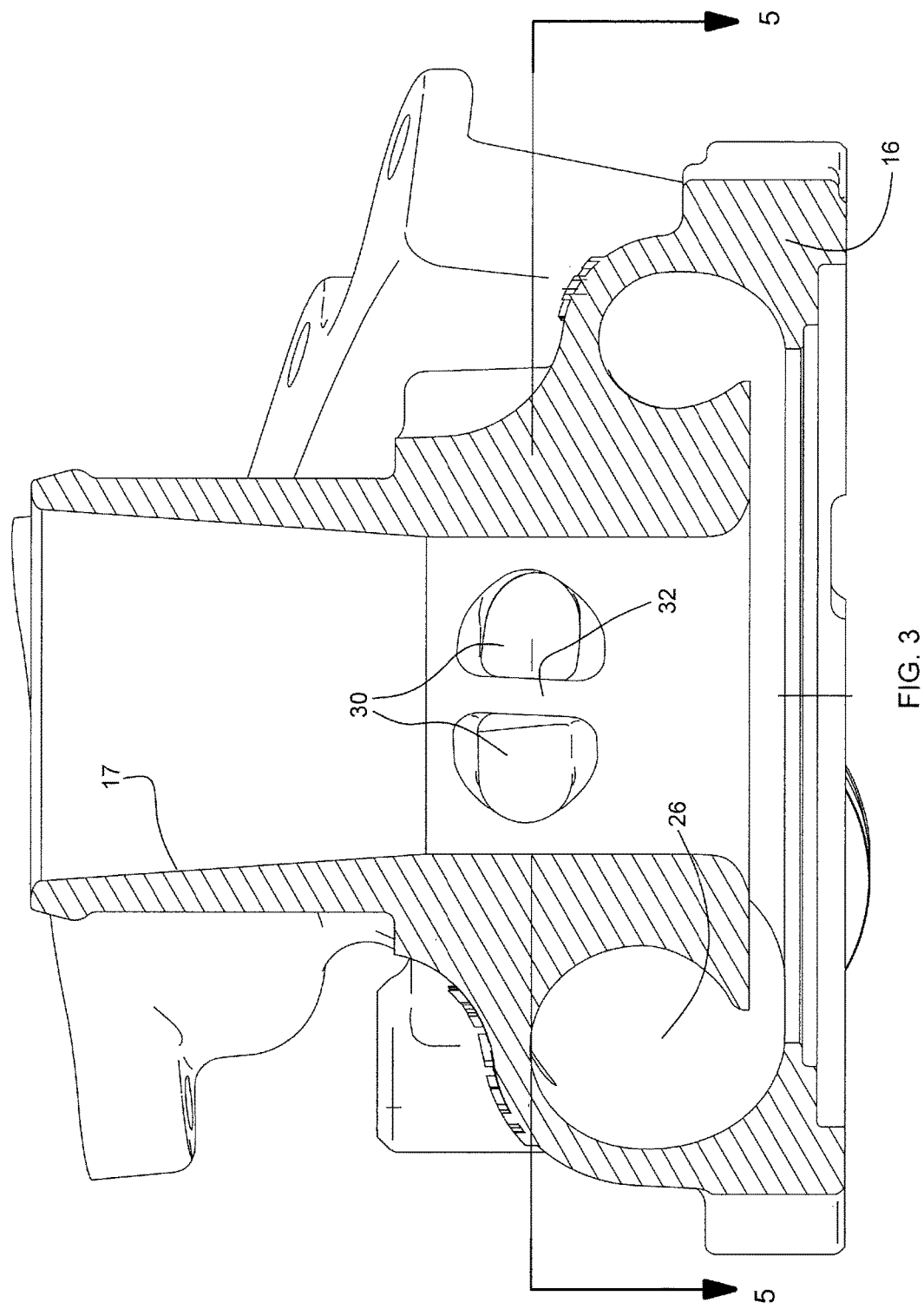
FIG. 3 is a cross-sectional view along line 3-3 in FIG. 2.
Figure 4:
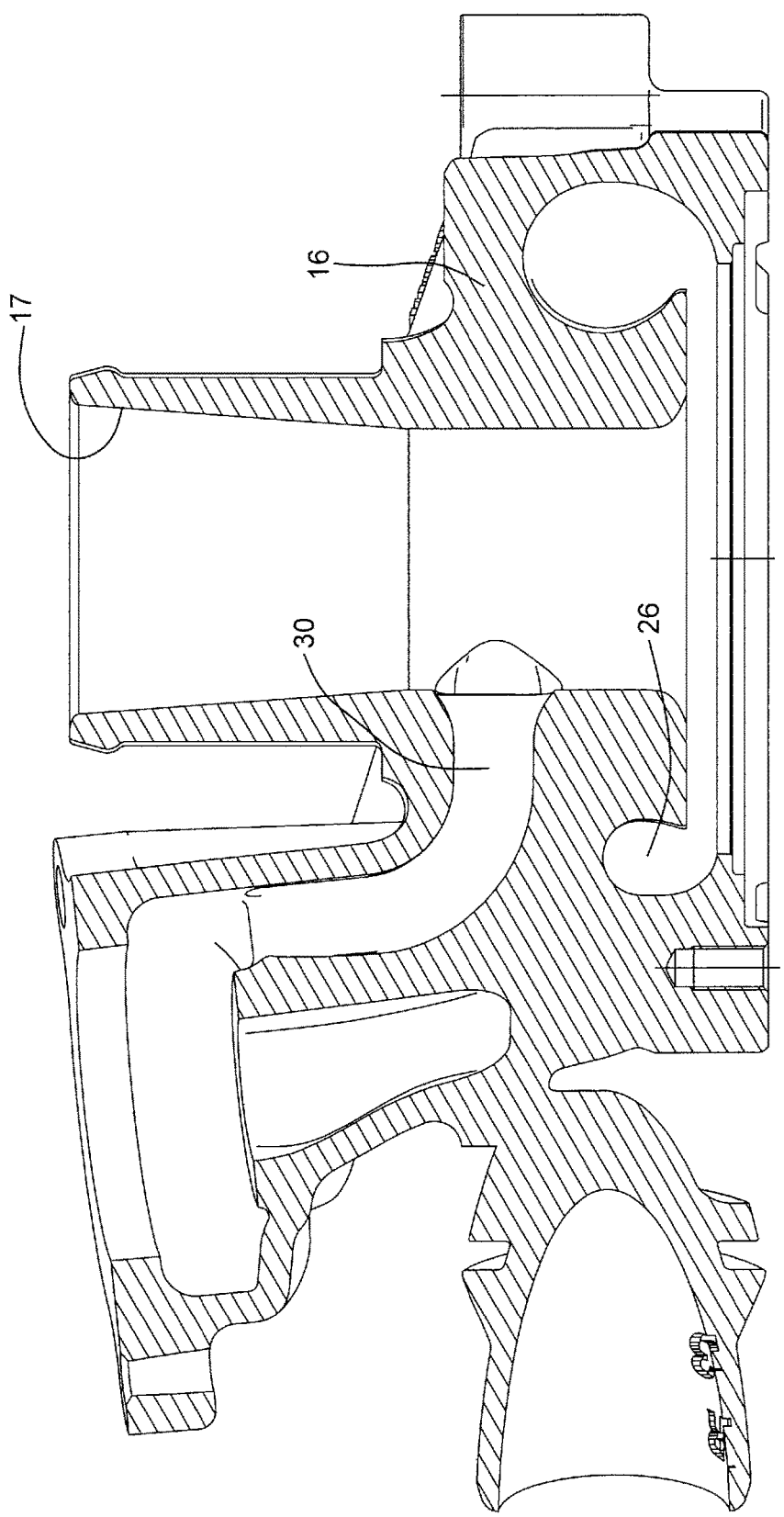
FIG. 4 is a cross-sectional view along line 4-4 in FIG. 2.
Figure 5:
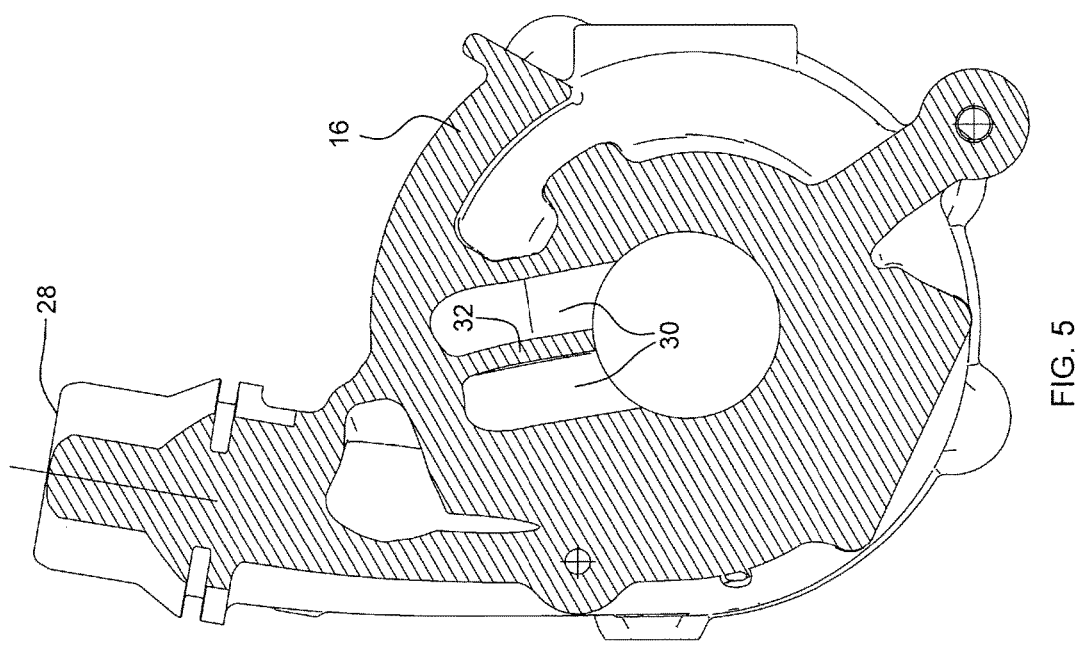
FIG. 5 is a cross-sectional view along line 5-5 in FIG. 3.

FIG. 1 illustrates a turbocharger 10 in accordance with a first embodiment of the invention, in axial cross-sectional view. The turbocharger 10 includes a compressor 12 comprising a compressor wheel 14 disposed in a cavity defined in a compressor housing 16. The compressor wheel is affixed to one end of a shaft 18 that is supported by bearings disposed in a center housing 20 fastened at one end to the compressor housing. The opposite end of the shaft 18 has a turbine wheel 22 affixed to it. The opposite end of the center housing is fastened to a turbine housing 24 that houses the turbine wheel.

The compressor housing 16 defines a discharge volute 26 that receives pressurized air from the compressor wheel. The compressor housing defines an outlet pipe 28 for leading the pressurized air from the discharge volute 26 to an intake of an internal combustion engine (not shown).

The compressor housing 16 also defines an inlet 17 for leading air into the compressor wheel, and a recirculation duct 30 connected to the inlet at a location upstream of the compressor wheel. A recirculation valve (RCV) 40 is disposed in the path between the discharge volute 26 and the recirculation duct 30 for regulating air flow through the recirculation duct into the inlet. The RCV comprises a valve housing 42 defining an axial flow passage 43 for compressed recirculation air, the passage 43 extending along a direction defined by an axis of the recirculation valve. The valve housing further defines a generally annular valve seat 44 encircling the axis, and an annular cavity 45 surrounding the axial flow passage 43, the annular cavity being in fluid communication with the axial flow passage. The annular cavity 45 connects with the recirculation duct 30.

The RCV includes a valve member 47 disposed in the axial flow passage 43. The valve member is linearly movable along the axis between a closed position wherein an end of the valve member contacts the valve seat 44, and an open position (as shown in FIG. 1) wherein the end of the valve member is axially spaced from the valve seat so that pressurized air can flow from the axial flow passage 43 into the recirculation duct 30 for recirculation back to the compressor inlet 17. Various mechanisms for effecting the movement of the valve member can be used in the practice of the invention. For instance, pneumatic actuation or electrical actuation can be employed, as two non-limiting examples.

In accordance with the invention in the embodiments described herein, the recirculation duct 30 does not constitute a single continuous volume, but rather comprises multiple channels or volumes. As one example, the duct 30 can be divided into two parallel channels, i.e., as essentially a round or oval duct with a divider wall 32 that divides it into two halves that extend parallel to each other in the flow direction along the channels. In this manner, each channel has roughly half the volume of the original single-duct design, and hence the natural frequency of each channel is raised substantially relative to the single-duct design.

FIGS. 1-5 show a first exemplary embodiment in which there is a single divider wall 32 in the duct 30 so as to divide the duct into two channels. The "length" of the divider wall 32 is defined herein as the dimension that extends along the flow direction through the duct. The divider wall's cross-section in a plane perpendicular to the length direction (FIG. 3) has a longer dimension termed the "width" herein; the "thickness" dimension is the smaller dimension in said plane. In the first embodiment, the width dimension of the divider wall extends generally axially (generally parallel to the turbocharger rotation axis, i.e., top-to-bottom of the page in FIG. 3), while the thickness dimension extends generally in the rθ direction (i.e., left-to-right in FIG. 3), termed the "tangential" direction herein.

Figure 6:
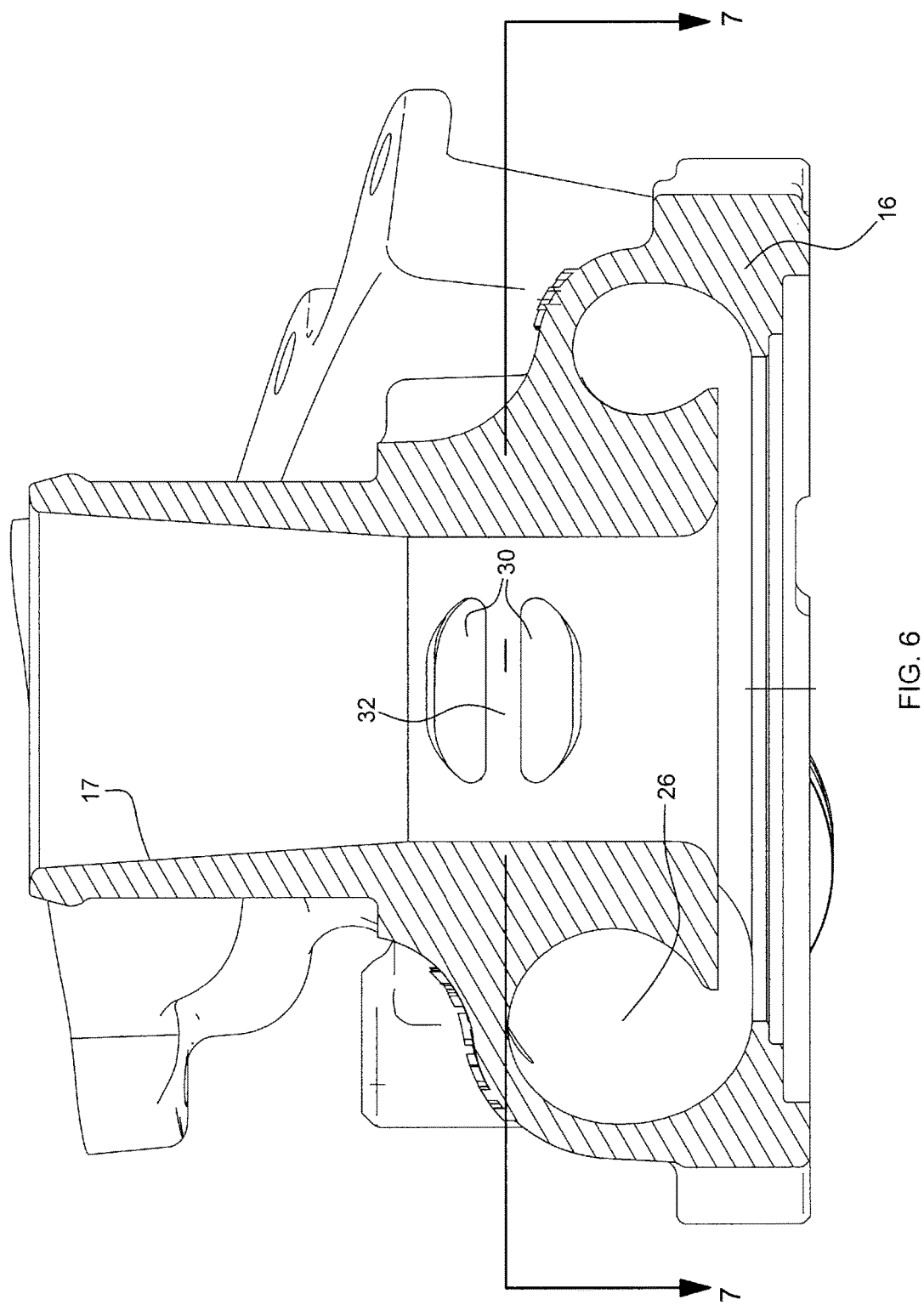
FIG. 6 is a view similar to FIG. 3, showing a second embodiment of the invention.

Alternatively, the divider wall can be oriented in other ways. For example, FIGS. 6 and 7 show an alternative embodiment in which there is a single divider wall 32 oriented with the width dimension along the tangential direction (i.e., left-to-right in FIG. 6) and the thickness dimension parallel to the axial direction (i.e., top-to-bottom in FIG. 6). Other orientations are also possible and are within the scope of the invention. The divider wall also can be twisted as it proceeds through the duct in the flow direction so that the width dimension is oriented axially at one end of the duct and tangentially at the other end, as one non-limiting example. Variations on these concepts are within the scope of the invention, there being no limitation with respect to the myriad possible orientations of the divider wall within the duct.

As yet another example, the duct can be divided into more than two parallel channels, for instance using two divider walls to create three channels, or three divider walls to create four channels, etc. Variations on these concepts are within the scope of the invention.

The two or more channels do not have to have equal flow areas or volumes; for example, in the case of two channels, one of the channels can have a volume that is two-thirds of the total combined volume, and the other channel can have a volume that is one-third of the combined volume.

The divider wall in other non-illustrated embodiments is not a full-length wall; that is, the length of the divider wall is less than the length of the inlet recirculation duct. For example, the divider wall can extend from the compressor inlet end of the duct partway along the length toward the opposite end of the duct at the recirculation valve. The divider wall can be confined to the straight portion of the duct (i.e., it does not continue into the portion of the duct that begins to curve as it proceeds further to the recirculation valve). Alternatively, the divider wall can start partway along the duct (i.e., not immediately at one end of the duct) and terminate before reaching the opposite end of the duct, such that there is a lengthwise portion of the duct at each end that is free of the divider wall. Again, variations on these concepts are within the scope of the invention Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A compressor comprising:
  a compressor housing defining a cavity, and a compressor wheel disposed in the cavity, the compressor housing defining an inlet for leading air into the compressor wheel, a discharge volute for receiving air compressed by the compressor wheel, and a recirculation duct connected to the inlet at a location upstream of the compressor wheel;
  a recirculation valve disposed between the discharge volute and the recirculation duct for regulating air flow through the recirculation duct into the inlet;
  wherein the recirculation duct comprises two parallel channels respectively conducting two parallel streams of air from the recirculation valve into the inlet, the two channels being formed by a dividing wall that divides the recirculation duct in two, wherein the dividing wall has a length that extends along a flow direction through the recirculation duct, a thickness that extends parallel to an axial direction of the compressor, and a width that extends perpendicular to the flow direction and perpendicular to the axial direction of the compressor.

2. The compressor of claim 1, wherein the two channels have equal cross-sectional areas on a cross-section that is perpendicular to a flow direction through the recirculation duct.

3. The compressor of claim 1, wherein a length of the divider wall is less than a length of the recirculation duct.

4. A turbocharger, comprising:
   a turbine comprising a turbine wheel disposed in a turbine housing, the turbine wheel being affixed to a shaft;
   a compressor comprising a compressor wheel disposed in a cavity of a compressor housing, the compressor wheel being affixed to the shaft, the compressor housing defining an inlet for leading air into the compressor wheel, a discharge volute for receiving air compressed by the compressor wheel, and a recirculation duct connected to the inlet at a location upstream of the compressor wheel;
   a recirculation valve disposed between the discharge volute and the recirculation duct for regulating air flow through the recirculation duct into the inlet;
   wherein the recirculation duct comprises two parallel channels respectively conducting two parallel streams of air from the recirculation valve into the inlet, the two channels being formed by a dividing wall that divides the recirculation duct in two, wherein the dividing wall has a length that extends along a flow direction through the recirculation duct, a thickness that extends parallel to an axial direction of the compressor, and a width that extends perpendicular to the flow direction and perpendicular to the axial direction of the compressor.

5. The turbocharger of claim 4, wherein the two channels have equal cross-sectional areas on a cross-section that is perpendicular to a flow direction through the recirculation duct.

6. The turbocharger of claim 4, wherein a length of the divider wall is less than a length of the recirculation duct.

* * * * *